(12) United States Patent
Shen et al.

(10) Patent No.: US 7,327,376 B2
(45) Date of Patent: Feb. 5, 2008

(54) MULTI-USER COLLABORATIVE GRAPHICAL USER INTERFACES

(75) Inventors: Chia Shen, Lexington, MA (US);
Frédéric D. Vernier, Romans (FR);
Clifton L. Forlines, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 990 days.

(21) Appl. No.: 10/613,683

(22) Filed: Jul. 3, 2003

(65) Prior Publication Data

US 2004/0046784 A1      Mar. 11, 2004

Related U.S. Application Data

(63) Continuation-in-part of application No. 10/177,004, filed on Jun. 21, 2002, now Pat. No. 6,894,703, which is a continuation-in-part of application No. 10/053,652, filed on Jan. 21, 2002, now Pat. No. 6,791,530, which is a continuation-in-part of application No. 09/651,002, filed on Aug. 29, 2000, now Pat. No. 6,545,660.

(51) Int. Cl.
*G09G 5/00* (2006.01)
*G06F 17/00* (2006.01)
*G06F 3/00* (2006.01)
*G06F 3/048* (2006.01)

(52) U.S. Cl. ............ 345/676; 345/418; 345/619; 345/672; 715/751; 715/788

(58) Field of Classification Search ............ 345/619, 345/660–6, 418, 676, 173, 649, 672; 715/764, 715/750, 7, 700, 751, 788; 382/296
See application file for complete search history.

(56) References Cited

OTHER PUBLICATIONS

Moghaddam, Baback et al., "PDH: A Human-Centric Interface for Image Libraries", Mistsubishi Electric Research Laboratories, Inc., 2002, pp. 1-6.*
Hoch, Michael et al., "Round Table: A Physical Interface for Virtual Camera Deployment in Electronic Arenas", CID Centre for User Oriented IT Design, 2001, pp. 1-12.*
Shen, Chia et al., "Around the Table", MERL-CRL, Mistubishi Electric Research Labs, pp. 1-4.*
Wellner P., "The DigitalDesk Calculator: Tangible Manipulation on a Desk Top Display," *Proceedings of UIST '91*, ACM Press, pp. 27-33, Nov. 1991.
Streitz, N. et al. "i-LAND: An Interactive Landscape for Creativity and Innovation," *Proceedings of the ACM Conference on Human Factors in Computing Systems (CHI'99)*, pp. 120-127, 1999.

* cited by examiner

*Primary Examiner*—Chante Harrison
(74) *Attorney, Agent, or Firm*—Dirk Brinkman; Clifton D. Mueller; Gene V. Vinokur

(57) ABSTRACT

A multi-user collaborative graphical user interface has a display area with a horizontal orientation, the display surface is positioned between the multiple users. The display area also has a centroid and a circumference. The display area is partitioned into work areas so that there is one working area for each user of the multiple users. An item is displayed in a particular working area using a global polar coordinate system centered on the centroid.

10 Claims, 12 Drawing Sheets

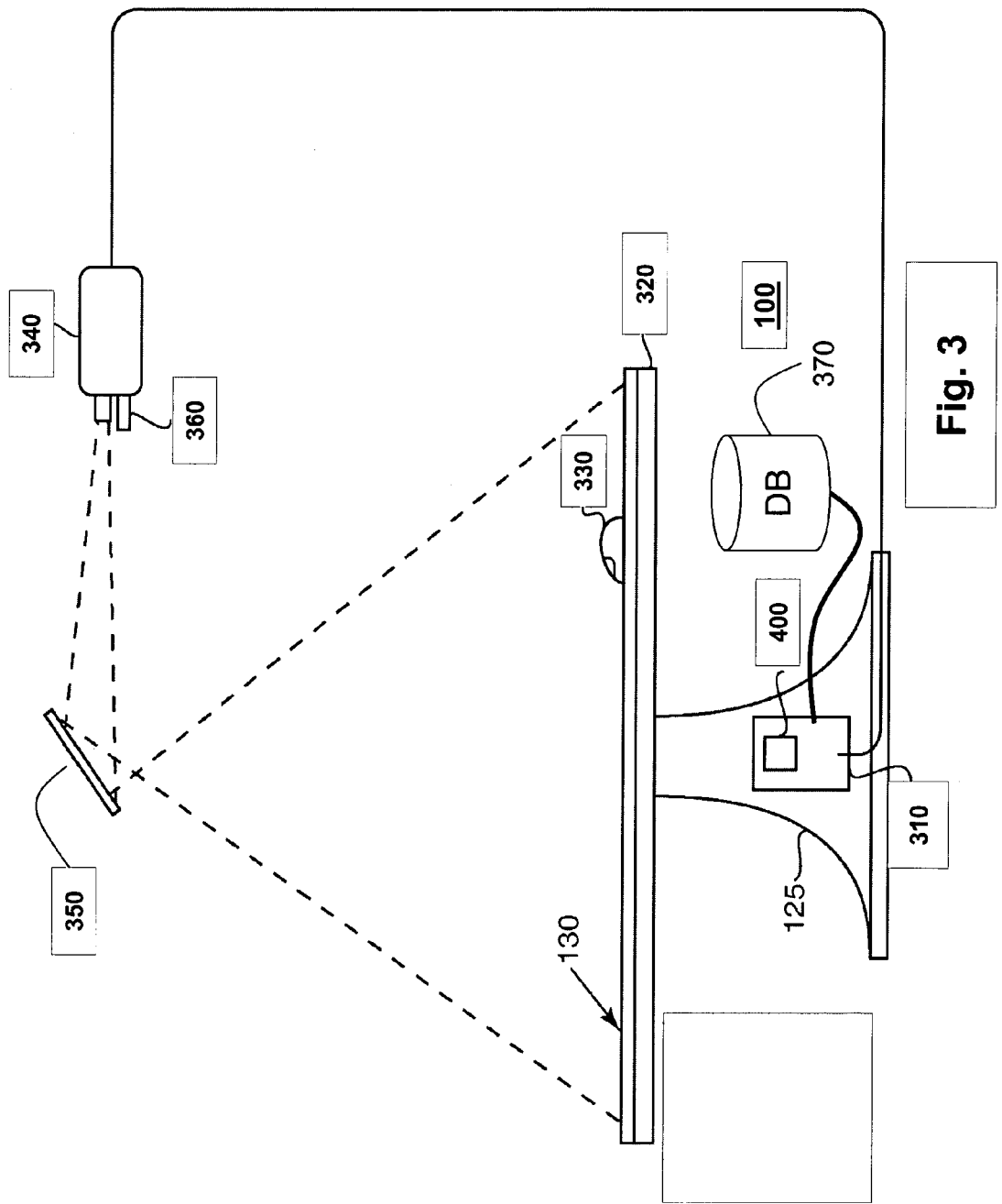

| | |
|---|---|
| 451 | a layer of pop-up items or top-level menus |
| 452 | a layer with selected images |
| 453 | a layer with the control or menu bar |
| 454 | a layer with all the images except one |
| 455 | a grid in a deformation mode |
| 456 | a layer for the background |

Fig. 4B

MULTI-USER COLLABORATIVE GRAPHICAL USER INTERFACES

CROSS-REFERENCE TO RELATED APPLICATION

This is a continuation-in-part of U.S. patent application Ser. No. 10/177,004 filed on Jun. 21, 2002 now U.S. Pat. No. 6,894,703, by Vernier et al., which is a continuation-in-part of U.S. patent application Ser. No. 10/053,652 "Circular Graphical User Interface" filed by Lesh et al. on Jan. 21, 2002 now U.S. Pat. No. 6,791,530, which is a continuation-in-part of U.S. patent application Ser. No. 09/651,002 "Multi-User Interactive Picture Presentation System," filed by Shen et al. on Aug. 29, 2000 now U.S. Pat. No. 6,545,660.

FIELD OF THE INVENTION

The present invention relates generally to graphical user interfaces, and more particularly to multi-user collaborative graphical user interfaces.

BACKGROUND OF THE INVENTION

Presentations are an important aspect of many professional and social settings. Executives make presentations to directors, managers conduct meetings with staff, salespersons make presentations to potential customers, doctors conduct meetings with nurses and patients, lawyers make presentations to juries, and families and friends present and share photographs of occasions in their lives.

Frequently, much effort goes into generating and delivering effective presentations. With specialized software, conventional personal computer systems can provide effective platforms for generating and conducting presentations. Currently available presentation program modules can turn a personal computer into a customized presentation system for generating and delivering picture presentations using display terminals or digital projectors.

Generally described, these prior art presentation systems provide a specially designed, user-friendly, set of tools to assist in the construction of a presentation that can be displayed subsequently to an audience. Those presentation systems also allow images to be presented sequentially to an audience, picture-by-picture, with color, animation, audio, and transition effects that enrich and enliven the presentation.

Conventional presentation systems do not provide an effective means for interacting with the content of the presentation during the course of the presentation. This drawback arises because these conventional presentation systems have only two modes of operation, an edit mode and a show mode. A single user often constructs the presentation, and a single user delivers the presentation to an audience. During the course of the presentation, the single user can interact with the content of the presentation only by invoking the edit mode, which primarily allows the user to rearrange the order in which the presentation is arranged.

A significant drawback arises when using these conventional presentation systems because all other participants of the presentation cannot concurrently interact with the content of the presentation.

Conventional systems are designed for use by a single presenter to a passive audience, and not for a setting where all participants of the presentation interact with the presentation on an equal footing. The prior art presentation is typically conducted in a linear setting. The presenter faces the audience, and the audience views the presentation behind the presenter. The presenter can either look at the audience or the presentation, but not at both at the same time.

Furthermore, a conventional presentation system only has a single set of controls. To allow any one other than the presenter to control the presentation can be quite disruptive and cumbersome. Also, most computer implemented presentation systems that concurrently display multiple images use the same rectangular format as used by mechanical slide-sorter. Those require that the typical single user has a specific orientation with respect to the displayed presentation. These types of systems are not suited for situations where multiple participants are facing each other and the displayed presentation, in a highly interactive and multi-dimensional manner.

An alternative presentation system can use a circular display surface, such as a tabletop. There are many advantages of tabletop displays over traditional presentation systems, such as white boards, projection screen, desktops computers, or handheld devices, particularly for collaborative tasks where multiple users need to both work with each other and access computer resources.

Users can sit around a table and thus easily face each other, rather than try to crowd around a computer screen, or a small handheld device. A tabletop provides shared space and also allows users to have their own personal, if not entirely private, space to work on. Finally, whether it is an electronic display or not, a tabletop affords a convenient space where users can spread out and organize images.

Recently, a number of alternative display systems have been described, see for example: Wellner P., "The DigitalDesk Calculator: Tangible Manipulation on a Desk Top Display," *Proceedings of UIST '91*, ACM Press, pp. 27-33, November 1991; Wellner P., "Interacting with Paper on the DigitalDesk," Comm. ACM Vol. 36, 7, pp. 86-96, 1993; Streitz, N. et al. "i-LAND: An Interactive Landscape for Creativity and Innovation," *Proceedings of the ACM Conference on Human Factors in Computing Systems* (CHI'99), pp. 120-127, 1999; Prante, T., Muller-Tomfelde, C., Streitz, N., Steinmetz, R., "ConnecTables: Dynamic Coupling of Displays for the Flexible Creation of Shared Workspace," *Proceedings of the 14th Annual ACM Symposium on User Interface Software and Technology* (UIST'01), November, 2001; and Guimbretiere, F., Stone, M., Winograd, T., "Fluid Interaction with High-resolution Wall-size Displays," *Proceedings of the 14th Annual ACM Symposium on User Interface Software and Technology* (UIST'01), November, 2001.

The DigitalDesk is a physical desk augmented with vision and projector capabilities so that the physical and electronic desktops are merged into one. DigitalDesk is designed for a single user. The InteracTable in the i-Land project provides a rectangular surface for multiple users. However, most of these tabletop user interfaces organize images in a rectangular manner. It is desired to provide a circular graphical user interface.

Collaborative circular graphical user interfaces present special problems, which cannot be addressed by conventional event-driven "window" architectures, such as Microsoft Windows™, where a single "desktop" interface is entirely constrained by Cartesian coordinates, and a single user. The problems with circular graphical interfaces stem from three unique characteristics of a collaborative user interface that is circular and is on a tabletop.

First, polar locations and polar orientations of displayed icons, documents, and images, generally "items," must be handled in a special way that is different from conventional rectangular formats.

Second, the number and variety of items that can be displayed is much larger than one would normally find on the traditional "desktop." Also, the items can be organized in multiple layers and views associated with concurrent users.

Third, events that drive the interface originate from collaborations between the multiple users. None of these issues are addressed by conventional windows-based architectures.

SUMMARY OF THE INVENTION

The invention provides visualization and layout schemes for a graphical user interface. Because the interface uses polar coordinate systems to display images, prior techniques, which typically use Cartesian coordinate systems, are inapplicable.

It is an object of the invention to give the user of the interface the full capability to relocate, re-orient, scale and layout images in the circular interface in real-time.

It is another object of the invention, to allow multiple users to collaborative display and manipulate images from multiple points of view.

A multi-user collaborative graphical user interface has a display area with a horizontal orientation, the display surface is positioned between the multiple users. The display area also has a centroid and a circumference. The display area is partitioned into work areas so that there is one working area for each user of the multiple users. An item is displayed in a particular working area using a global polar coordinate system centered on the centroid.

BRIEF DESCRIPTION OF THE DRAWINGS

FIG. 3 is a side view of the circular graphical user interface of FIG. 1;

FIG. 4b is a block diagram of rendering layers used by the invention;

DETAILED DESCRIPTION OF THE PREFERRED EMBODIMENT

System Structure

Figure 1:
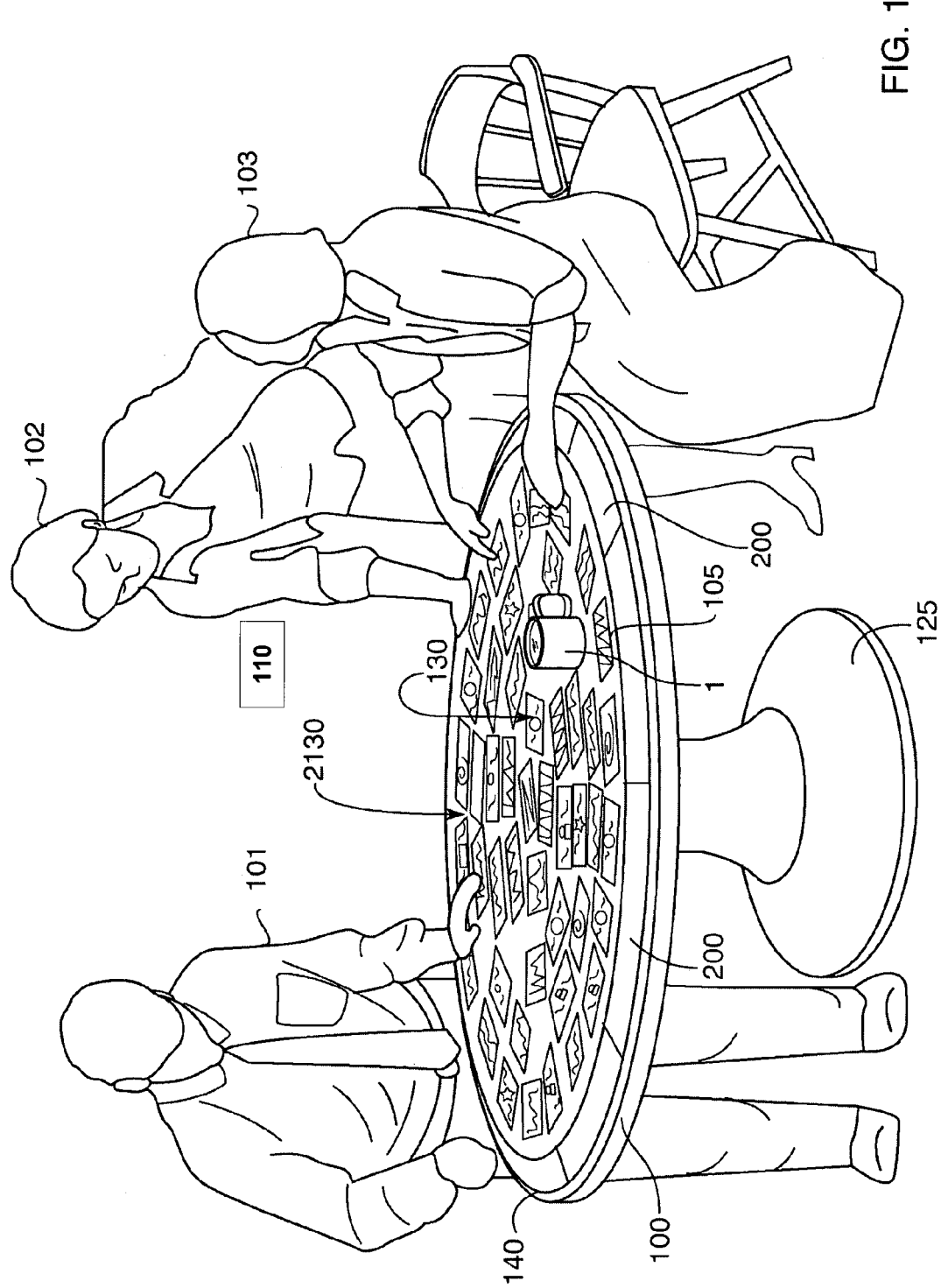
FIG. 1 is an oblique view of a multi-user circular graphical interface according to the invention.

FIG. 1 shows multiple users 101-103 in the vicinity of a circular graphical user interface 100 operating according to the invention. The users share and interact with a picture presentation in a dynamic and collaborative manner. The system according to the invention displays images 110 on a display surface, i.e., the horizontal tabletop 130 of a circular table 125. The images can be of photographs, videos, computer generated images, icons, documents, or any other displayable source material, hereinafter generally "items." In the preferred embodiment, the tabletop 130 surface is touch sensitive.

The interface 100 includes an orientation area 140, and a plurality of control panels (menus) 200. In the preferred embodiment, the orientation area 140 is an annular ring at the periphery of the images. The control panels are composited within the annular ring. There is one control panel or top-level menu for each user. Additional pop-up menus can be added as needed. Pop-up menus are generally temporary.

The control panels 200 are displayed in a region of the display surface 130 in front of the user. A camera 360, see FIG. 3, can be used to track the users 101-103 so that as the users move around the display table, their respective control panels 200 follow. Alternatively, the users can employ a pointing device to indicate where their respective control panels should appear on the tabletop.

Figure 2:
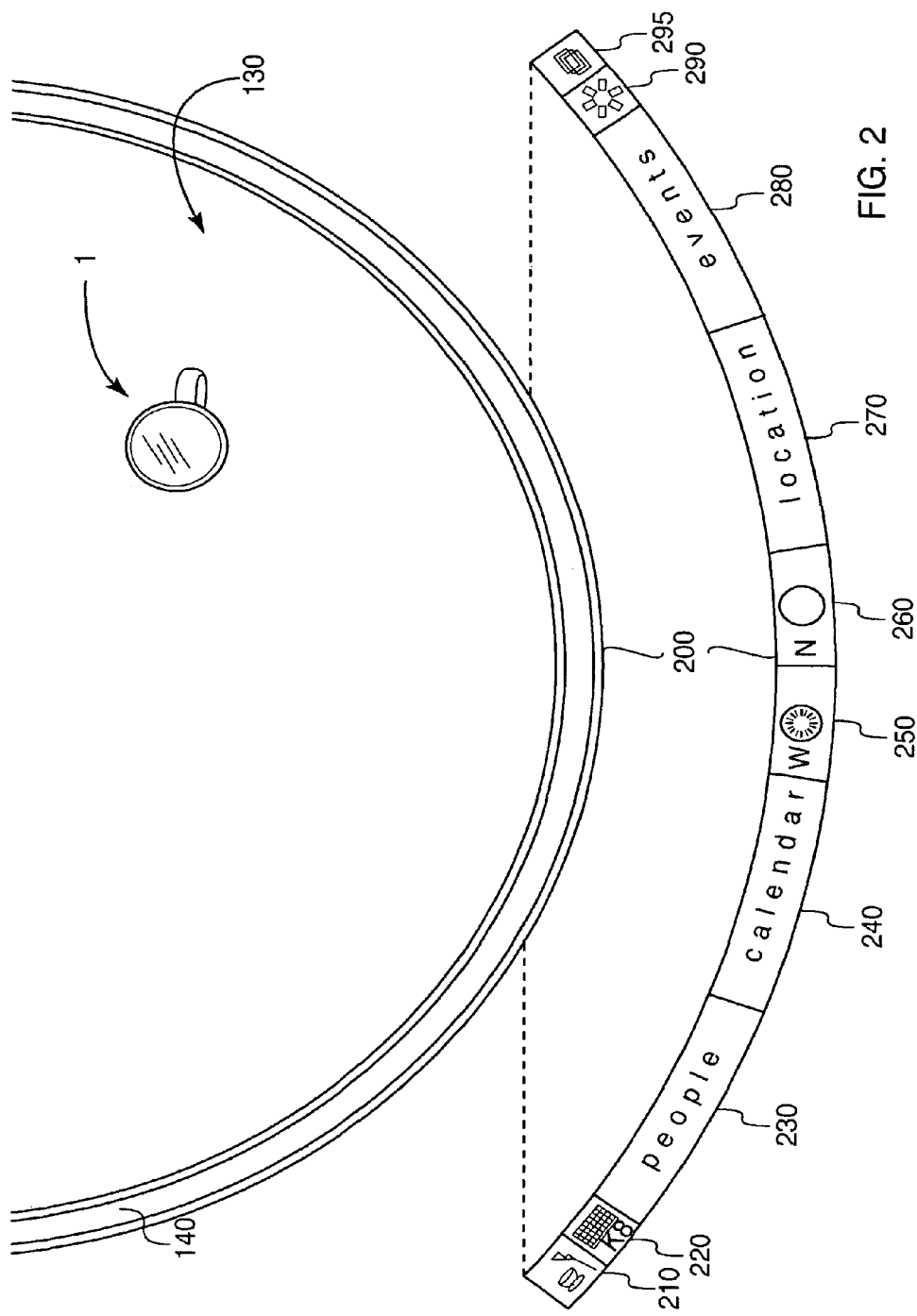
FIG. 2 is a top view of a control bar of the interface of FIG. 1.

FIG. 2 shows icons of the control panel 200 in greater detail. Each user control panel includes the following icons: inkpad 210, keyboard 220, people 230, calendar 240, work space 250, new 260, location 270, events 280, show 290, and summary 295 icons. A mouse or a touch sensitive technique can be used to activate the icons of the control panels 200. Initially, the icons are displayed as black on a white background, but when an icon is activated or selected, the icon is displayed in full color.

The people, calendar, location, and events icons can be associated with corresponding "views." In the traditional windows-based desktop, there is only one associated view. However, here, each user can construct one or more views of what can be displayed on the tabletop, and users can select any of these view as an active view, i.e., the active view is the one that is currently displayed. For example, an "event view" organizes clusters images according to events, a "calendar view" clusters images acquired in the same time frame, and a "location view" clusters images according to geographic location. In essence, a view is a set of images having some logical relationship.

As shown in FIG. 3, images of items are composited by a processor 310 executing a software architecture 400 according to the invention. The composited images are displayed onto the display surface. The displayed images are composited in response to user input commands (events). User input can be via a touch surface 320, keyboard, mouse 330, and the like. As an advantage, the present system can be operated concurrently by multiple users. In the preferred embodiment, the display surface is circular. For tabletop display, the images are displayed via a projector 340, and mirror 350. The projector could be vertically mounted, or back-projection can be used to eliminate the need for the mirror. The fact that a single projector is used is significant, because this requires that the output image is potentially composited from a large number of individual images.

As stated above, the camera can be used to establish the relative locations of the users 101-103 with respect to the interface 100.

Some of the Figures also show a coffee mug 1 on the top of the table. The coffee mug 1 is not part of the invention, but often coffee mugs are key items present during presentation, professional or social. As an advantage, the present invention gracefully admits integration of coffee mugs or other physical discussion items with the presentation. In fact, using the camera 360 coupled to a vision system of the processor 310, the displayed images can be composited in such a way that physical items that are not part of the user interface do not obscure significant portions of the images.

The main purpose of the architecture 400 according to the invention is to manipulate and present photographs, slides, text, videos, the "items." The items are manipulated by the users using the control panels and other input devices that generate "events." The images can be associated with sound-tracks so that when images are selected, the sound-track can also be played. The images can also be annotated with text.

The item can be organized in a database (DB) 370. The database can be local, or remote. The items can be in the form of digital images, e.g., files with bmp, .jpg, mpg, .gif, .pdf, or .eps extensions, to name but a few. These files form the source data from which images are formed. Images can have associated audio files in .wav files, for example. The items can also be annotated by name, date, location, etc. Items are selected from the database 370, and the selected items are composited into the displayed images as "views", as described below. Multiple users can interact with compositing process in a concurrent and interactive manner. The orientation area 140 is used to orient the "content" of the presentation image 110 or active view. When the orientation area is circular, then the displayed image can be rotated like a lazy Susan. The rotation is achieved by the processes that composites the image with a selected orientation. The ring can be projected onto the touch sensitive surface of the tabletop.

The images of the items are generally shown with an orientation towards the control panel from where the selection took place, i.e., generally facing the user that selected the item. Should another user subsequently want to view the same image, selection can rearrange and reorient the image in the overall image accordingly, as described in further detail below.

In order to support individual user viewing preferences and group shared viewing needs, the interface provides two general user interface functions. First, the entire displayed image can be freely rotated in either direction. This operation is a very convenient way to pass around a global layout of the interface for each individual user's viewing angle. In addition, we allow control panels to be positioned along the perimeter of the tabletop wherever a user is sitting.

Interface and Image Orientations

Traditional rectangular interfaces, such as by windows-based architectures, typically assume that the user or users always view the interface from roughly the same direction and angle, namely from directly in front of a terminal or screen. Prior art interfaces typically use a rectangular (Cartesian) coordinate system to display images. For example, the images are almost always aligned according to the rows and columns of pixels, which can sometimes further define rectangular windows that partition the display area or screen. When pixels an images are aligned, transformations such as affine translation and scaling are straight forward.

In contrast, our invention enables face-to-face collaborations where the interface is situated between the users, and thus we must consider issues of rotation and re-orientation of the entire display interface, including the images that are displayed there. Thus, we provide an architecture for visualizing and collaborative interacting in order to facilitate the convenient re-orientation of any or all images on the interface surface, the passing images around the interface surface, and the size of the user interface and the images.

Architecture Overview of Circular Graphical User Interface

Figure 4A:
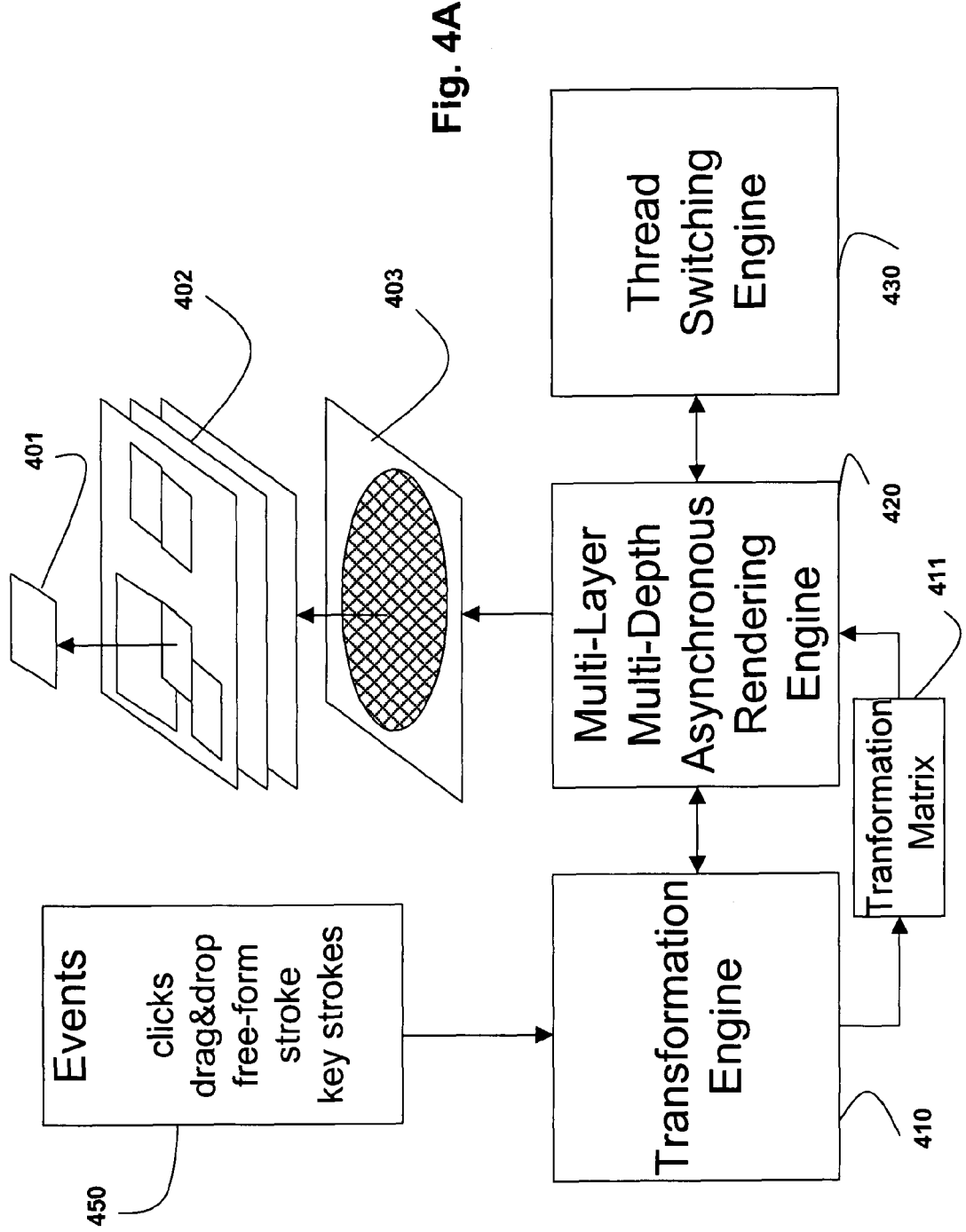
FIG. 4a is a block diagram of the user interface of FIGS. 1 and 3.

FIG. 4 shows architecture and method 400 for collaborative circular graphical user interfaces. The architecture includes a transformation engine 410, an asynchronous rendering engine 420, and a thread-switching engine 430 coupled to each other. The operation of the engines is in response to external events 450, such as mouse clicks, drag&drop events, free-form stroke events, touch events and keyboard events.

In response to the events 450, the transformation engine 410 generates polar coordinates for a transformation matrix 411 of graphics context and input events. The rendering engine 420 coordinates multi-layer, multiple depth rendering functions, and the switching engine 430 coordinates multiple execution threads, multiple image layers, and multiple tabletop views. With these three engines, correct and efficient correspondence between input events and output rendering is assured.

The architecture 400 operates on layers of images. A set of layers can be collected to form a view. Multiple views can be maintained concurrently. A view is formed by compositing the set of layers associated with the view in a predetermined order. An active view is the presentation image 110 that is currently displayed on the tabletop. The types of layers can include item layers 401, view layers 402, and a background layer 403. To ensure all of the pixels of the final image have some value, the background layer has no transparent pixels. For example, the pixels in the background layers are initially all set to blue.

The number of layers can change over time. During rendering, the items 401 are composited into the view layers 402, which are then composited onto the background layer 403. Associated with each layer is an image buffer. Thus, any layers that have not changed since the last refresh can be copied directly to a display or video buffer during rendering. In a preferred embodiment, a double buffering technique is used. While a first buffer is displayed, a second buffer is filled with pixels. Then, the second buffer is displayed, and the first is filled with pixels, and so forth.

Layers

FIG. 4b shows one possible set of layers that can be composited into a view. For the purpose of merging and rendering, the layers can be numbered, e.g., top-to-bottom 0, 1, 2, 3, 4, etc, where one layer is always defined as the "top" layer. A compositing operation can be carried out at any layer with all of the lower layers. For example, layer 3 is a compositing of layers 0+1+2+3, and layer 4 is a compositing of layers 1+2+3+4.

For example, the layers can include the following layers in a top-to-bottom order. A layer 451 of pop-up items or top-level menus, which always are on top, if it exists. Generally, pop-up menus are temporary. A layer 452 of selected images, which is on top layer if layer 451 does not exist. A layer 453 layer with the control or menu bar 200, which is the top layer if none of the above layers exist. A layer 454 with all the images except the selected images. A layer 455 for a deformation grid. A deformation grid assists the users in visualizing how a view can be deformed. For example, items near the center of the view can be spaced closer and appear smaller than those near the edges of the view to give a "black-hole" type of effect. At the very bottom there is a background layer 456.

Transformation Engine

With our architecture, the users 101-103 can rotate the entire active view 110, or move individual images within the view. Individual images can be moved using affine transformations, i.e., translation, scaling, and rotation. Because the interface is primarily circular, two polar coordinate systems are maintained. A global polar coordinate system is assigned to an entire view, and a local polar coordinate system is assigned to individual images within a view. The moving of the images is responsive to the events 450.

The transformation engine 410 handles all of the necessary primitives to build a circular interface based on these two polar coordinate systems. In a traditional GUI, it is very common to use a hierarchy of components to partition the screen layout (desktop) into smaller regions. This is possible because in a rectangular interface, a rectangle can be partitioned into smaller rectangles with each region operating only on a local coordinate system, and where there is only one common direction of orientation for each displayed visual object. For example, on a desktop interface, all images are vertically aligned and rotation is not possible.

In contrast, a polar coordinate based interface has no predominant direction for displayed items. Thus, it is not possible to partition the screen and resolve the smaller problems in a local frame coordinate system, and then assembling the global layout from the local layouts as in windows-based desktop architectures.

In the polar coordinate system, there is one and only one center that is meaningful. All the items must know where this center is at all times. Therefore, it is necessary to describe every item to be displayed with a polar location and a polar orientation at the same time.

Polar Coordinate System

Figure 5:
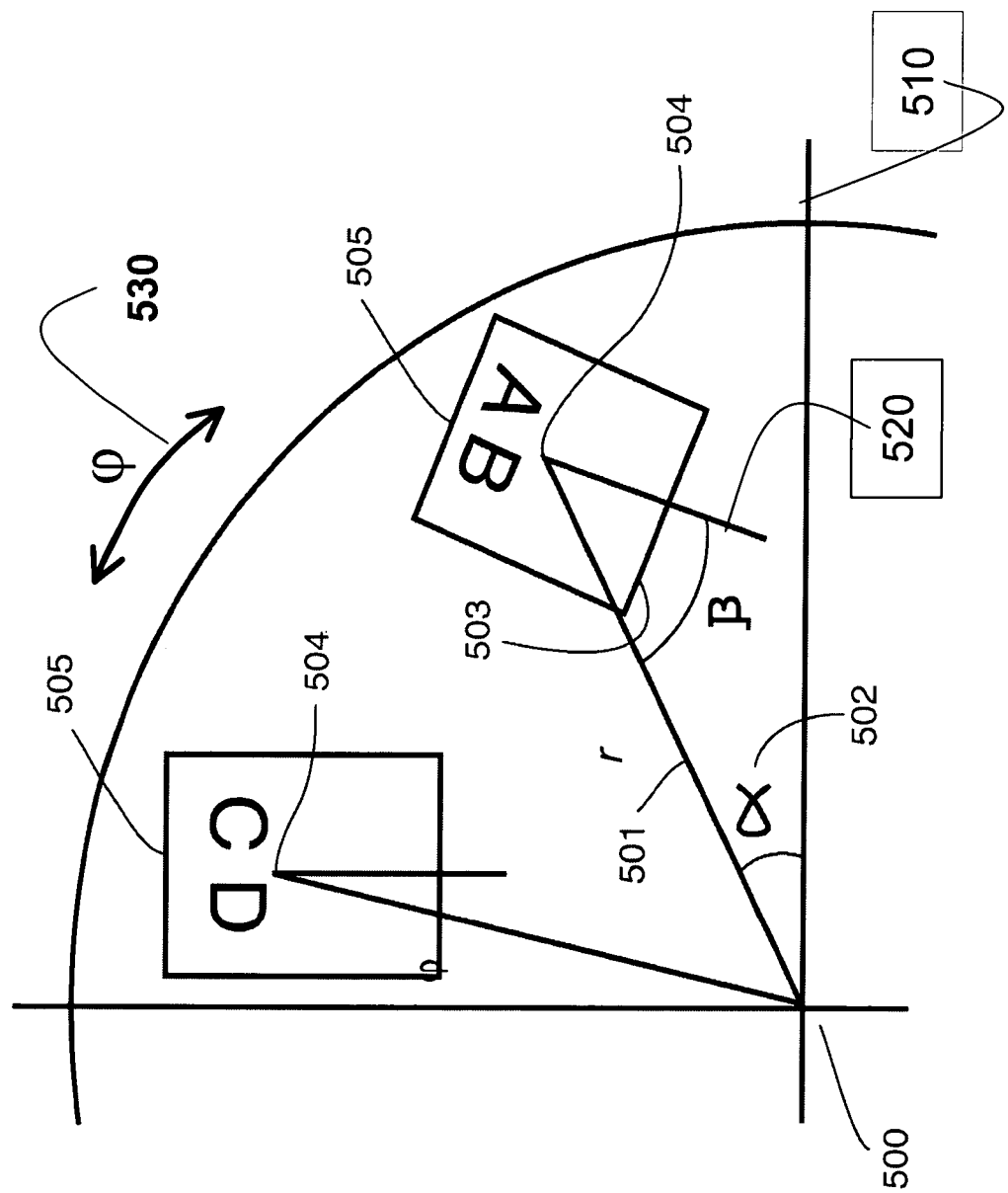
FIG. 5 is a diagram of polar coordinate systems used by the invention.

As shown in FIG. 5, the architecture according to the invention uses two polar coordinate systems to determine three variables: a radial distance r 501 from a center 504 of each image 505 to the center 500 of the display surface, i.e., a "view," an angle $\alpha$ 502 of rotation around the center of the view, and an angle $\beta$ 503 of rotation around the center of each image. The angle $\alpha$ is with respect to some virtual reference line 510 of the display surface, and the angle $\beta$ is an offset from angle $\alpha$ to a central axis 520 of each image. For comparison, the item 505 labeled "AB" has an angle $\beta$ greater than an angle $\alpha$, and the item 505 labeled "CD" has a very small angle $\beta$ and an angle $\alpha$ that is close to 90°. In addition, there is a global angle $\phi$ 510, which determines how much the entire view is rotated, with respect to some arbitrary reference position.

Even when the $\beta$ angles are zero, the $\alpha$ angles are different for these two documents, and the documents will have different orientation. This problem does not exist in a Cartesian framework. With the introduction of the $3^{rd}$ degree of freedom, the angle $\beta$ 503, it is possible to rotate every item around the item's own center.

To manage the relative position of each item, element, the transformation engine 410 translates a position $(r_{501}, \alpha)$ of an item into the transformation matrix 411, and the local angle $\beta$ 503. For example, the transformation uses $\beta=-\alpha+\phi$) to rotate all the elements displayed on the tabletop to face the same direction towards a user's location at the table, defined by the angle $\phi$ 510, which is the global angle used to rotate the entire view. It is also possible to use intermediary values between $\beta=-\alpha+\phi$ and $\beta=0$ to re-orient documents in a continuum.

Multi-Layer Multiple-Depth Asynchronous Repaint Engine

The circular graphical interfaces, as described herein, allows users to "pile," "shuffle," "pass," and "spread" items on the tabletop (view), see FIG. 1. Scaling (zooming) to various resolutions is also permitted. Therefore, it is necessary to display and refresh potentially a very large number of items in a particular view, perhaps as many as a thousand or more. This is a couple of orders of magnitude larger than the number of windows one would have "open" in a conventional desktop display.

Because each individual item itself can have a large number of pixels, the total number of pixels to be processed for a single refreshed composition of an active view can be extremely large.

For this reason, multi-layers are used by the rendering engine 420. Whenever, the "content" of the active view changes in position, orientation, or size, the rendering engine 420 determines which layers that need to be rendered, and the order of the rendering of the layers. This determination is based on the events 450, e.g., rotate the entire view, resize and reorient selected items, move an item from one layer to another, construct a composite image for a particular layer, update item attributes, and so forth.

Each item is potentially part of a displayable image with attributes describing its properties such as size, current location, and angle of orientation, and a pointer to the actual file in the database 370 that forms the source data for the item. It is also possible to associate application specific attributes with an item. For example, for digital images, users can add attributes for shadow generation, paint quality/resolution parameterization, and information about whether the item can be rotated, or not.

In the multi-layer representation, the item layer 452 usually includes one or more selected items. Selected items are being actively controlled by the users and cause events 450, e.g., the item is being rotated, passed to another users, etc. To reflect a change in the display of a selected item, it is sufficient to composite a new version of the item with the view layer 454 that is to contain the item, and then to composite that layer with the background layer 456. Activating a different view, merely causes that view to be composited with the background layer, the individual items of that view do not need to be composited until they are selected.

In other words, compositing is a bottom-to-top order. The background (deepest) layer 456 is relatively static, e.g., an initial blue color that is then overwritten with a deformation grid, map, or a tablecloth texture. In the case where multiple views are used, a different background can be used to distinguish each view.

This layer is composited first. However, changing the background requires a recompositing of all layers on top of the background. Layering, reduces the number of times layers or views need to be recomposited. The top layer is always the last layer to be composited on top of previous layers.

Figure 6B:
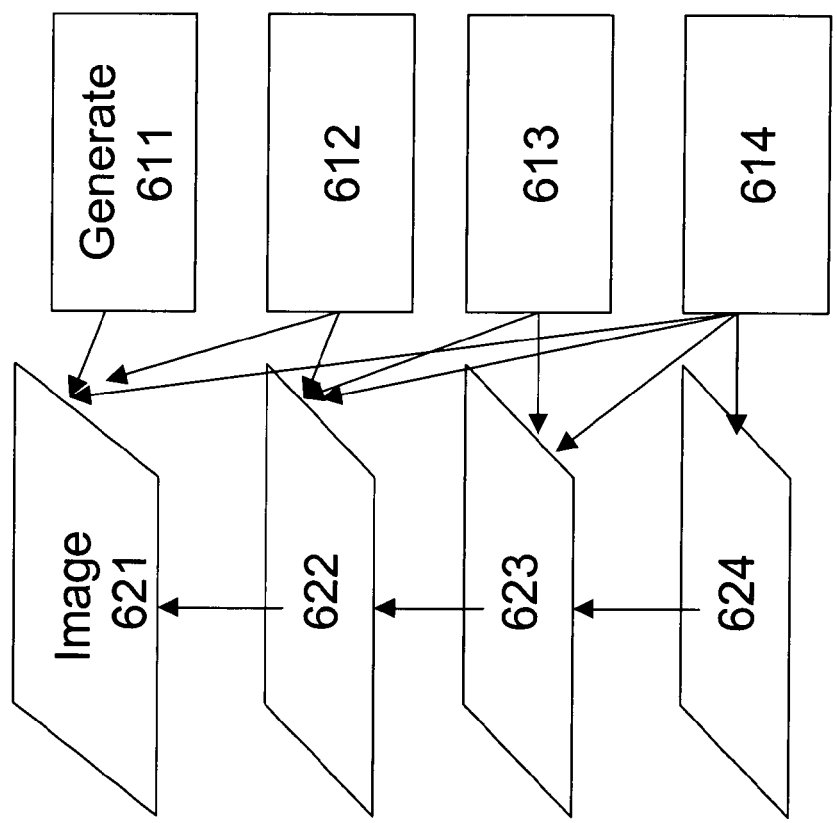
FIG. 6b is a block diagram of rendering a pyramid.
Figure 6A:
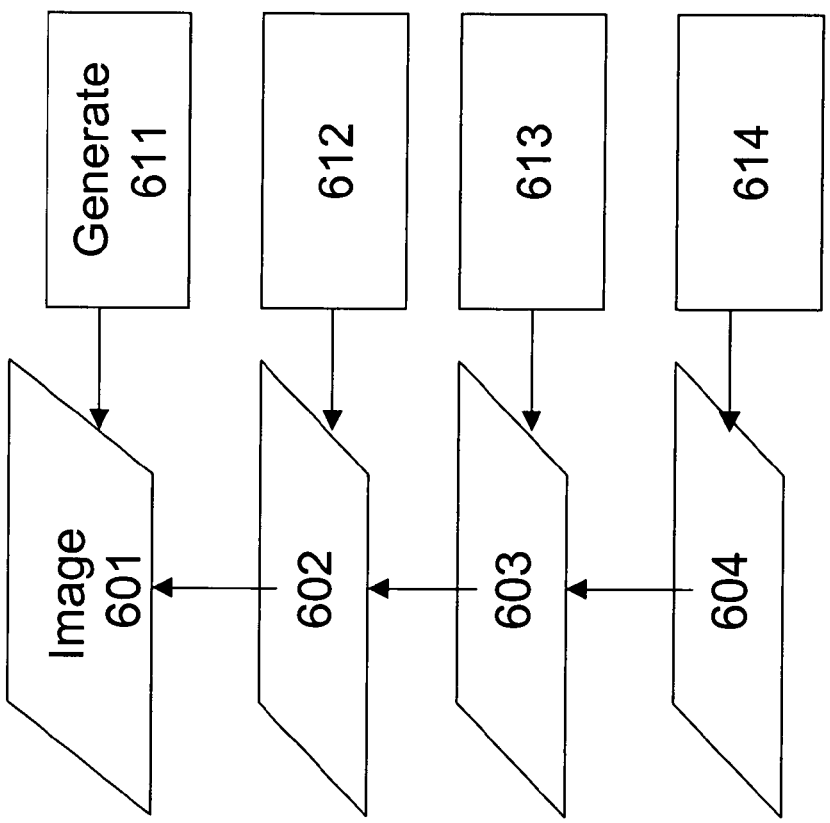
FIG. 6a is a block diagram of rendering a pile.

As shown respectively in FIGS. 6a and 6b, two rendering strategies can be used. In the first strategy, images 601-604 are generated 611-614 (left arrows) for all items in each layer. The generation is from source data of each item according to parameters such as size and orientation. The layers can then be composited (up arrows) in a bottom-to-top order to render a view. In the second strategy, each layer 621-624 includes itself as well as all layers below it. These two strategies are called "pile" and "pyramid" respectively. To be useful, the pyramid has a smaller number of items in the top layers that change more frequently than items in deeper layers. These two strategies can be used in conjunction, e.g., a pile layer can be composited with a pyramid layer. The pyramid layers 621-624 can be generated from the pile layers 601-604 to factorize the generation process.

Thread Switching

The rendering engine 420 according to the invention executes multiple threads concurrently and asynchronously. The asynchronous rendering is accomplished by maintaining an independent rendering thread for each layer.

The multi-layer representation enables selective rendering of parts of the view displayed on the tabletop. Most of the time, only a single image of a selected item needs to be regenerated. For example, one user is "passing" a photograph to another user, or zooming on the photograph. However, if a user rotates the entire view on the tabletop, then all layers may need to be composited into a single new rotated view. In other cases, some parts of the view on tabletop remain stationary, for example, a user's control panel, while the rest of the image rotates.

The threads are executed so that the number of images that need to be generated from source data is minimized. Also, latency is minimized. For example, if a user moves an item, and then rotates the entire view, the entire view is updated, and a rendering pass for the single item is discarded.

The architecture also includes threads for timers. Timers can be used to animate items. Other threads are used to acquire source data from the database.

Multiple Views and Multiple Control Bars

As stated above, the architecture supports multiple views. One simple use of this feature is to provide multiple virtual tables but all using the same space in the user environment. More importantly, it allows different users to view the same items in different ways to get a different perspective. For example, users can discuss photographs based on who is in them, when they were taken, or where they were taken, each representing a different view.

When switching to a different view in a multiple view system, the list of the items in the multi-layer representation can be different in different views. The set of items, the size of the items, the background, and how other information is displayed can vary for different views.

The architecture provides control panels that allow users to switch between views and control the application in various ways. The architecture supports multiple curved control panels, one per user, that can be dragged freely along the border of the circular view displayed on the tabletop.

In the traditional windows GUI, it is common to have pop-up menus for selected items. These are always displayed with the same vertical orientation. This is not the case with the circular interface, where pop-up menus are aligned with the users facing the periphery of the interface. In this case, rotating the display may confuse the users. Therefore, the system can leave a "shadow" of the pop-up menu at its original location associated with the selected item.

Multiple Work Areas

Figure 10:
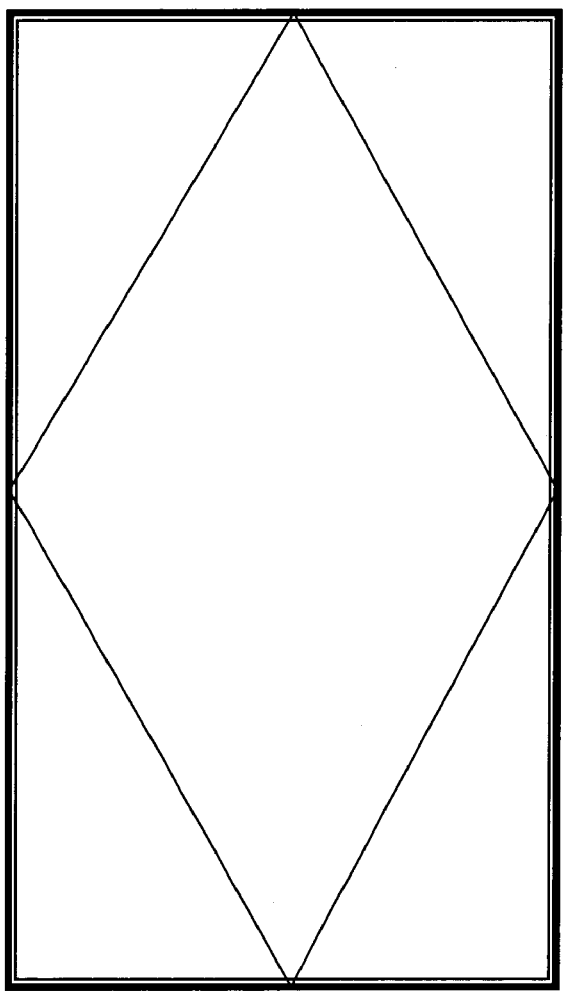
FIG. 10 shows a display area partitioned into five work areas according to the invention.
Figure 11:
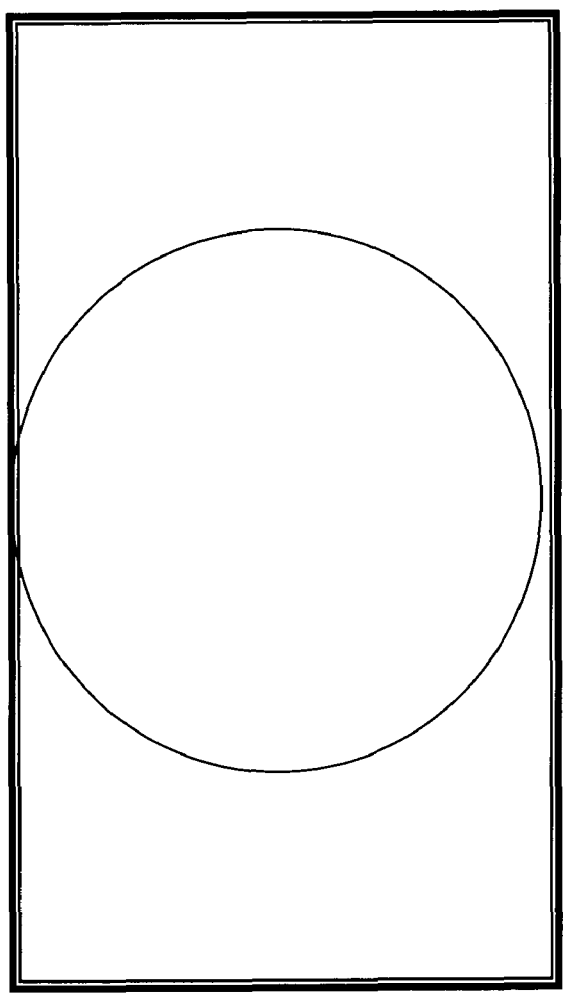
FIG. 11 shows a display area partitioned into three work areas according to the invention.

As shown in FIG. 1, up to now, the display area 100 is configured as a single contiguous work area. However, as shown in FIGS. 7-8 and 10-11, it is also possible to partition the display area 100 into multiple (N) work areas 701 and 801, for a circular table 700 or rectangular table top, where there is one work area for each user, e.g., three or four. A single work area can also be associated with multiple cooperating users. The partitioning is effected, for example, by radii extending from the centroids 710, 810 to the perimeter of the display areas. FIGS. 10 and 11 show how the display area is partitioned into work areas with other shapes. Note in the work area the menus face the users.

Figure 7:
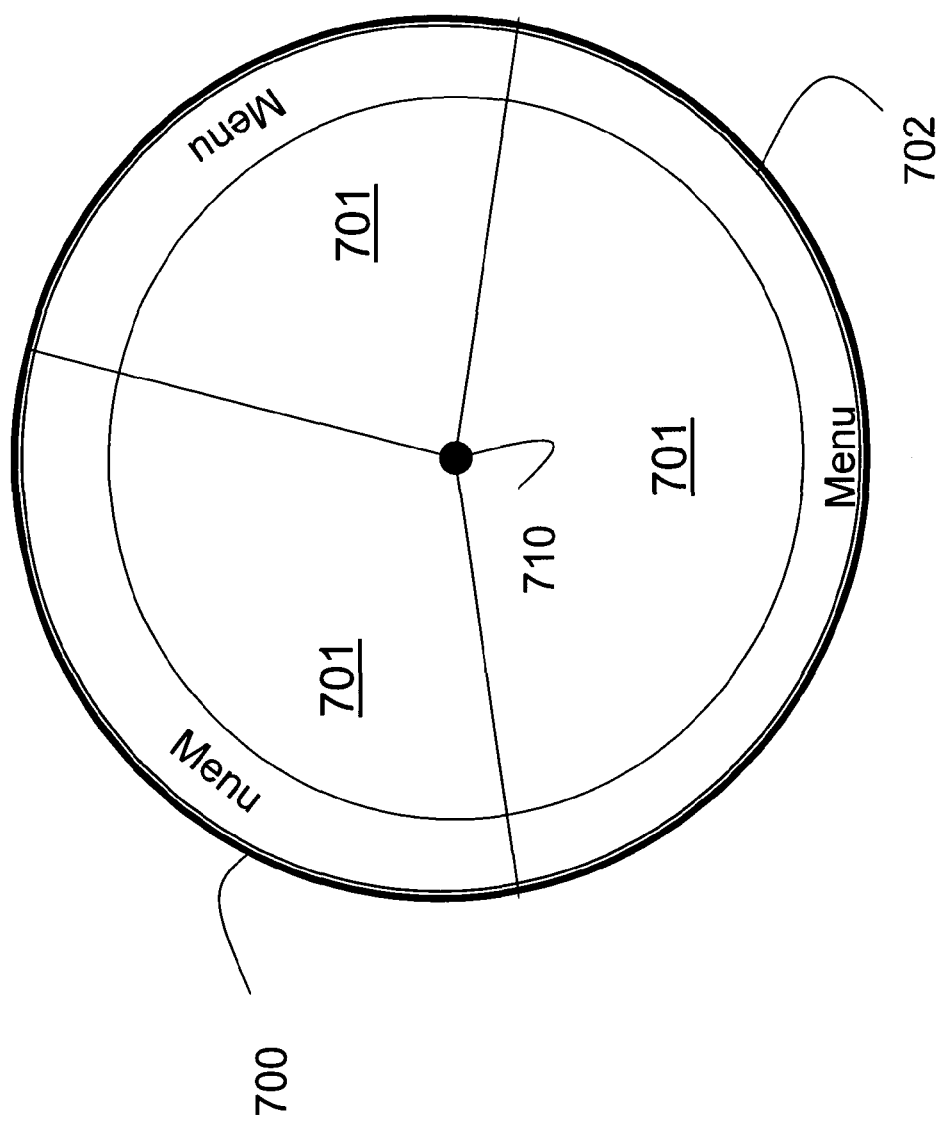
FIG. 7 shows a display area partitioned into three work areas according to the invention.
Figure 8:
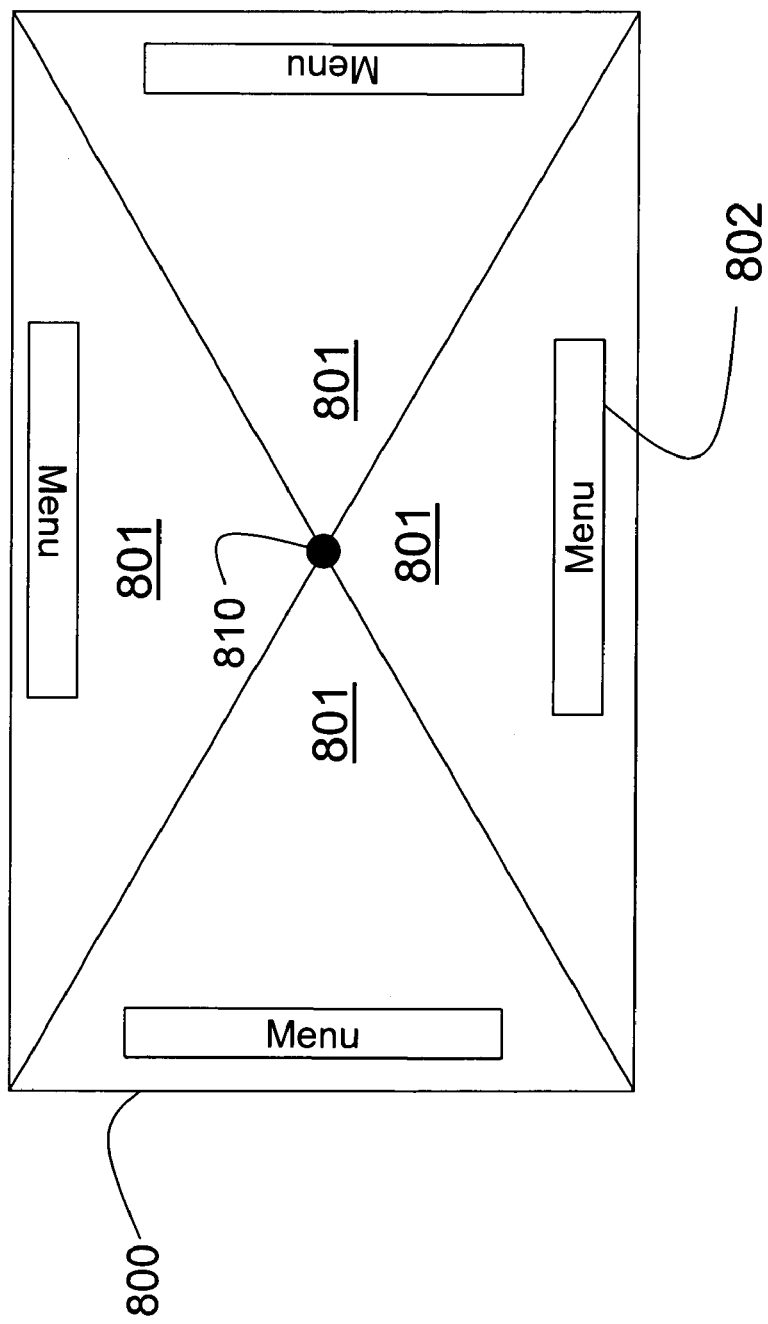
FIG. 8 shows a display area partitioned into three work areas according to the invention.

Note, the size of the work areas can vary for each user, as shown in FIG. 7. In this embodiment, the items, e.g., images, documents, video, icons, are orientated within each work area so that they face the corresponding user, generally, using the polar transformation based techniques described above.

In this case, each work area can include a user specific control panel or menus 702 and 802 also oriented towards the user within the work area. In this embodiment, menu actions and item manipulation are coordinated according to the work areas. Users can relinquish control of an item by passing it to another work area. As an item leaves one area and enters another, the polar orientation is adjusted to correspond to the new work area.

Figure 9:
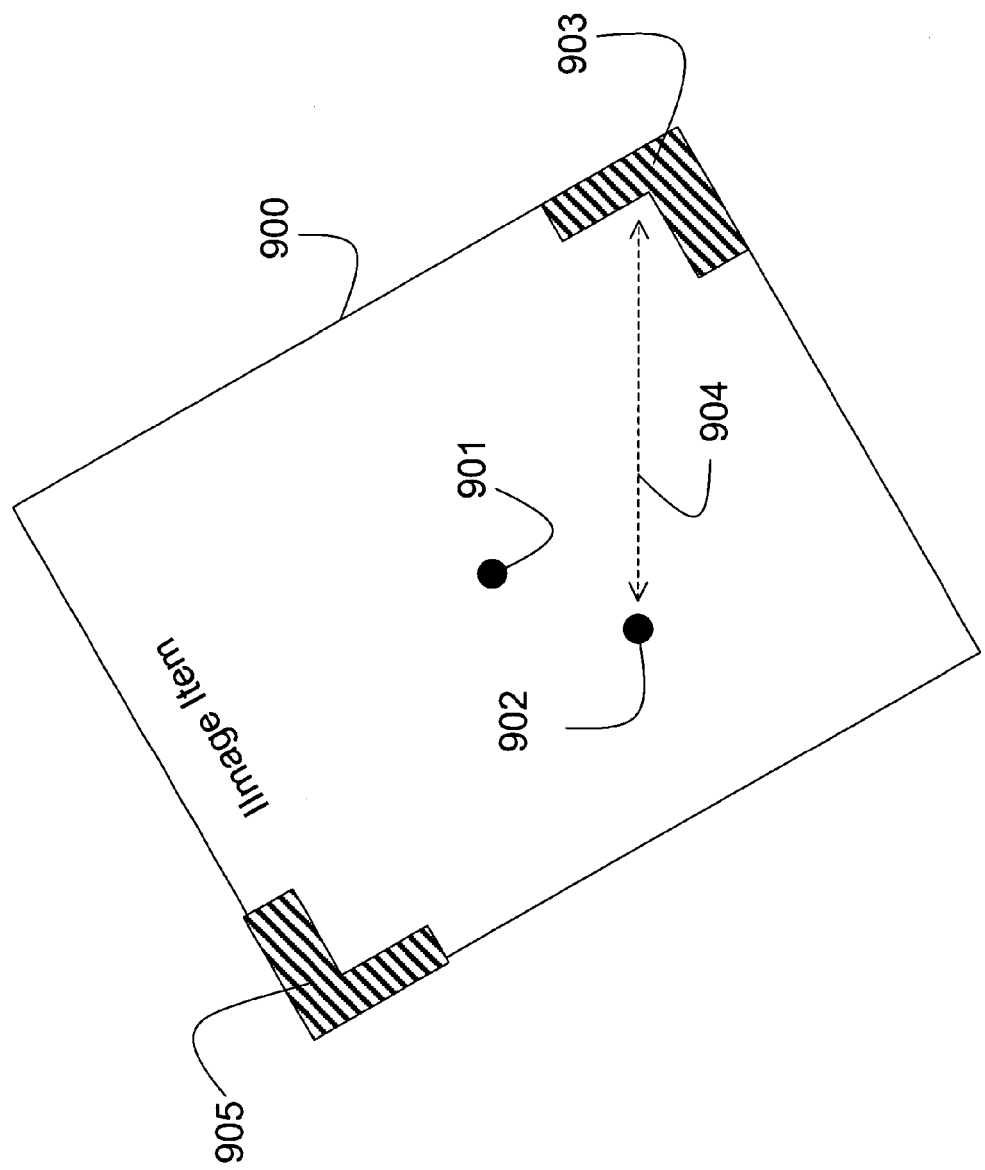
FIG. 9 shows an item with control points.

As shown in FIG. 9, in order to dispatch user actions to the correct item 900, and more specifically to the correct location and work area for the item, because an item can be composed of multiple parts, such as a title, hyperlinks, images, documents, user interface buttons, etc., we provide a mechanism based on a variable item control point 902, as opposed to the item centroid 901 as the default control point above.

In the general case, items are oriented according to multiple parameters, e.g., the number of users, the location of the users around the display area. The variable control point 902 of the particular item 900 is determined dynamically when the user "touches" or points at a displayed document for the first time. In the way, we never have to handle a double constraint, i.e., the position of the control point relative to the centroid of the item and the position of the centroid of the document in a complex multi-user interface. The invention also provides a mechanism where the user can "grab" an item by at the control point.

There also is a resize mechanism which can have multiple levels of sensitivity. A resize area 903 is located at a corner of the item; a resizing scale factor is based on a distance 904 from the corner associated with the resize area to the variable control point 902. Another corner 905 can be used to rotate the item about the centroid 901.

It should be note, that each work area can have a set of appearance and operation attributes. The appearance attributes control how the work area appears, e.g., size, orientation, background color, size and color of documents inside area, font, etc. The operation attributes indicate access privileges, read/write/modify parameters, how items are manipulated, and the like.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A multi-user collaborative graphical user interface for displaying items, comprising;
    a rectangular display area having a horizontal orientation, the display surface positioned between the multiple users, the display area having a centroid and a circumference;
    a plurality of work areas partitioned from the display area, there being one working area for each user of the multiple users; and
    means for orienting a displayed item in a particular working area using a global polar coordinate system centered on the centroid.

2. The interface of claim 1, further comprising:
    means for selecting a control point for a particular displayed item; and
    means for orienting the displayed item in the particular working area using a local polar coordinate system centered on the a control point.

3. The interface of claim 1, further comprising:
    means for displaying a control panel in each work areas, there being one control panel for each of the plurality of users; and
    means for orienting the control panel in the particular working area using the global polar coordinate system centered on the centroid.

4. The interface of claim 1, in which the display area is circular.

5. The interface of claim 1, in which the control panel only controls items displayed in the corresponding work area.

6. The interface of claim 1, in which the item includes a title, a hyperlink, and an image.

7. The interface of claim 1, in which a corner of the item includes a resize area, and wherein a resizing scale factor is based on a distance from the resizing area o the control point.

8. The interface of claim 1, in which the display area is partitioned by radii extending from a centroid of the work area to a perimeter of the work area.

9. The interface of claim 1, in which each work area has associated appearance attributes.

10. The interface of claim 1, in which each work area has associated operation attributes.

\* \* \* \* \*